(12) United States Patent
Callant

(10) Patent No.: US 8,632,950 B2
(45) Date of Patent: Jan. 21, 2014

(54) CYANINE DYES AND LITHOGRAPHIC PRINTING PLATE PRECURSORS COMPRISING SUCH DYES

(75) Inventor: Paul Callant, Edegem (BE)

(73) Assignee: Agfa Graphics NV, Mortsel (BE)

( * ) Notice: Subject to any disclaimer, the term of this patent is extended or adjusted under 35 U.S.C. 154(b) by 8 days.

(21) Appl. No.: 13/501,598

(22) PCT Filed: Oct. 15, 2010

(86) PCT No.: PCT/EP2010/065512
§ 371 (c)(1),
(2), (4) Date: Apr. 12, 2012

(87) PCT Pub. No.: WO2011/051112
PCT Pub. Date: May 5, 2011

(65) Prior Publication Data
US 2012/0208126 A1    Aug. 16, 2012

Related U.S. Application Data

(60) Provisional application No. 61/255,140, filed on Oct. 27, 2009.

(30) Foreign Application Priority Data

Oct. 27, 2009  (EP) .................................. 09174164

(51) Int. Cl.
G03F 7/004 (2006.01)
B41C 1/10 (2006.01)
C09B 23/12 (2006.01)
C07D 209/60 (2006.01)

(52) U.S. Cl.
USPC .............. 430/282.1; 430/281.1; 430/270.1; 430/302; 430/945; 430/138; 548/427

(58) Field of Classification Search
None
See application file for complete search history.

(56) References Cited

U.S. PATENT DOCUMENTS 3,976,493 A * 8/1976 Borror et al. ............... 430/579
6,777,164 B2 * 8/2004 Horne et al. ................ 430/278.1
2006/0275698 A1 * 12/2006 Nguyen et al. ............. 430/270.1

FOREIGN PATENT DOCUMENTS

| EP | 1 129 861 A1 | 9/2001 |
| EP | 1 275 497 A2 | 1/2003 |
| EP | 1 736 312 A1 | 12/2006 |
| EP | 1 914 069 A1 | 4/2008 |
| EP | 2 072 570 A1 | 6/2009 |
| WO | WO-2011051112 A1 * | 5/2011 |

OTHER PUBLICATIONS

Official Communication issued in International Patent Application No. PCT/EP2010/065512, mailed on Nov. 30, 2010.

* cited by examiner

Primary Examiner — Cynthia Hamilton
(74) Attorney, Agent, or Firm — Keating & Bennett, LLP

(57) ABSTRACT

A lithographic printing plate precursor includes a cyanine dye, characterized in that the cyanine dye includes two different chromophoric groups, a chromophoric group that has its main absorption in the infrared region and another chromophoric group that has its main absorption in the visible light region. The cyanine dye has preferably a structure according to Formula I:

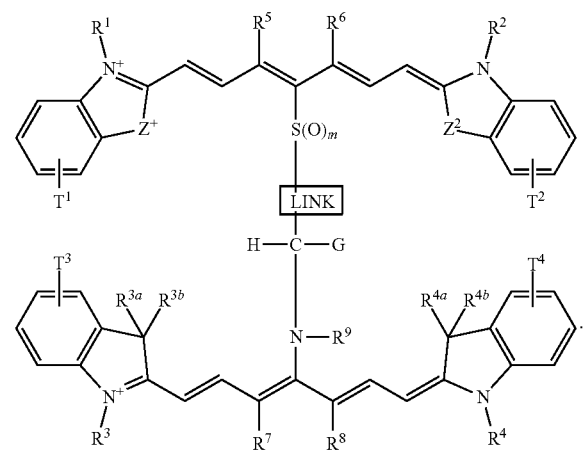

Formula I

16 Claims, No Drawings

CYANINE DYES AND LITHOGRAPHIC PRINTING PLATE PRECURSORS COMPRISING SUCH DYES

CROSS-REFERENCE TO RELATED APPLICATIONS

This application is a 371 National Stage Application of PCT/EP2010/065512, filed Oct. 15, 2010. This application claims the benefit of U.S. Provisional Application No. 61/255,140, filed Oct. 27, 2009. In addition, this application claims the benefit of European Application No. 09174164.5, filed Oct. 27, 2009.

BACKGROUND OF THE INVENTION

1. Field of the Invention

The invention relates to a cyanine dye which combines the functions of IR-dye and contrast dye in a lithographic printing plate precursor and to lithographic printing plates comprising such dyes.

2. Description of the Related Art

In lithographic printing, a so-called printing master such as a printing plate is mounted on a cylinder of the printing press. The master carries a lithographic image on its surface and a printed copy is obtained by applying ink to said image and then transferring the ink from the master onto a receiver material, typically paper. In offset lithographic printing the ink is first transferred to a rubber blanket and then to paper. In conventional, so-called "wet" lithographic printing, ink as well as an aqueous fountain solution (also called dampening liquid) are supplied to the lithographic image consisting of oleophilic (or hydrophobic, i.e. ink-accepting, water-repelling) areas as well as hydrophilic (or oleophobic, i.e. water-accepting, ink-repelling) areas. In so-called "driographic" printing, the lithographic image consists of ink-accepting and ink-adhesive (ink-repelling) areas and during driographic printing only ink is supplied to the master.

In the so-called "direct-to-plate" method, a digital document is transferred directly to a printing plate precursor by means of a platesetter. A printing plate precursor used in such method is often called a digital plate. With the so-called thermal digital plates, an infrared laser is used to image infrared radiation sensitive precursors. There are different types of thermal digital plates, the most important ones being: negative working plates comprising thermoplastic polymer particles of which the imaging mechanism is based on coalescence of those polymer particles; negative working photopolymerizable plates of which the imaging mechanism is based on polymerization of the images areas and positive working plates of which the imaging mechanism is based on photosolubilization.

These infrared radiation sensitive precursors have as common ingredient a compound that triggers the imaging mechanism by absorbing and converting the infrared radiation, which is used to image the precursors, into heat. Such compounds are often dyes, commonly referred to as IR-dyes.

Another ingredient all these plates have usually in common is a contrast dye and/or pigment. Such a contrast dye or pigment absorbs in the visible region and, due its presence in the print areas of the plate after exposure and processing, gives rise to an image, which can be visually inspected before printing.

It has been observed that such IR-dyes and/or contrast dyes, present as major ingredients in the coating of the precursors, can also have an impact on properties of the precursor other than the ones described above. For example it is well known that in positive thermal plates, of which the image forming mechanism is based on rendering the exposed areas of the coating more soluble in a developer, the IR-dyes as well as the contrast dyes may function as inhibitors, i.e. rendering the coating less soluble in a developer. Also, in EP-A 1914069 it was found that in a lithographic printing plate precursor comprising thermoplastic polymer particles, an IR-dye and a contrast dye, the total amount of IR-dye and contrast dye may have an influence on the clean-out behaviour of the precursor. It may be that an optimized total amount of IR-dye and contrast dye adsorbed on the surface of the polymer particles renders those particles more dispersible in an aqueous solution (for example the developer) and therefore results in an improved clean-out.

When the lithographic properties of a precursor are influenced by the total concentration of IR-dye and contrast dye, it has been observed that these properties may change upon ageing of the precursor. For example in case of a printing plate precursor comprising thermoplastic polymer particles, an IR-dye and a contrast dye, it has been observed that upon ageing of the precursor, especially at high relative humidity, the clean-out behaviour may become insufficient. Such an insufficient clean-out may then result in toning on the printed sheet. It may be that, upon ageing of the precursor, especially at high relative humidity, the IR-dyes and/or contrast dyes adsorbed on the surface of the polymer particles undergo a redistribution, resulting in a worsening of the clean-out behaviour. Especially precursors of which the grained and anodized aluminium support has not been subjected to a so-called post anodic treatment may be subject to such a worsening of the clean-out behaviour upon ageing.

SUMMARY OF THE INVENTION

In order to overcome the problems described above, preferred embodiments of the present invention provide a cyanine dye that combines the functions of IR-dye and contrast dye in a lithographic printing plate precursor.

Another preferred embodiment of the present invention provides a lithographic printing plate precursor comprising such a cyanine dye and having sufficient lithographic properties after ageing.

Still another preferred embodiment of the present invention provides a method of preparing such a cyanine dye from a heptamethine cyanine precursor.

The above and other elements, features, steps, characteristics and advantages of the present invention will become more apparent from the following detailed description of the preferred embodiments.

DETAILED DESCRIPTION OF THE PREFERRED EMBODIMENTS

Cyanine Dye

Cyanine dyes comprising two or more chromophoric groups and their use in lithographic printing plates are disclosed in EP-As 1129861 and 1275497. However, these cyanine dyes all have identical chromophoric groups that absorb infrared radiation.

The lithographic printing plate precursor according to a preferred embodiment of the present invention comprises a cyanine dye having two different chromophoric groups, a chromophoric group that has its main absorption in the infrared region, i.e. radiation having a wavelength in the range from 750 to 1500 nm, and another chromophoric group that has its main absorption in the visible light region, i.e. in the range from 400 to 700, preferably in the range from 550 to 700 nm. Preferably the first chromophoric group has its absorption maximum in the infrared region while the second chromophoric group has its absorption maximum in the range from 550 to 700 nm.

The cyanine dyes according to a preferred embodiment of the present invention preferably have a structure according to Formula I;

Formula I

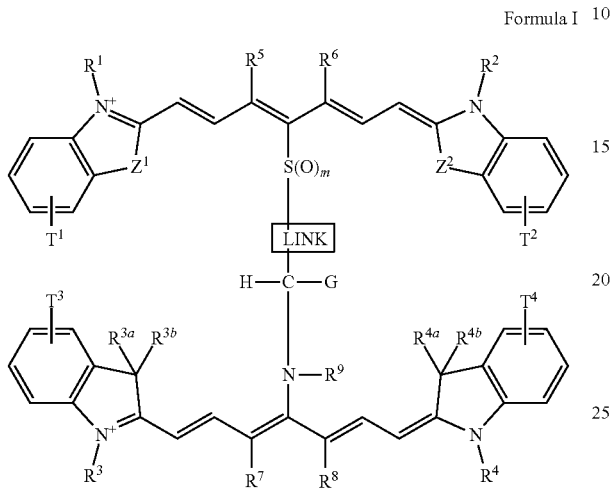

wherein $Z^1$ represents S, $CR^{1a}R^{1b}$ or —CH=CH—;

$Z^2$ represents S, $CR^{2a}R^{2b}$ or —CH=CH—;

G represents H, $CO_2R$ or CONR'R" wherein R, R' and R" independently represent H or an optionally substituted alkyl, aralkyl or aryl group;

$R^{1a}$, $R^{1b}$, $R^{2a}$, $R^{2b}$, $R^{3a}$, $R^{3b}$, $R^{4a}$ and $R^{4b}$ independently represent an optionally substituted alkyl, aralkyl or aryl group and wherein $R^{1a}$ and $R^{1b}$, $R^{2a}$ and $R^{2b}$, $R^{3a}$ and $R^{3b}$, $R^{4a}$ and $R^{4b}$ may form a ring;

$R^1$, $R^2$, $R^3$, and $R^4$ independently represent an optionally substituted alkyl group;

$R^5$, $R^6$, $R^7$ and $R^8$ independently represent hydrogen or an optionally substituted alkyl or aryl group and wherein $R^5$ and $R^6$, $R^7$ and $R^8$ may form a ring;

$R^9$ represents hydrogen or an optionally substituted alkyl group;

$T^1$, $T^2$, $T^3$, and $T^4$ independently represent H, F, Cl, Br, I, $CF_3$, CN, an optionally substituted alkyl, alkoxy or aryl group, an optionally substituted annulated benzo ring, —$CO_2R^{a1}$, —$CONR^{a2}R^{a3}$, —$SO_2NR^{a4}R^{a5}$, —$SO_2R^{a6}$, —$SO_3^-$ and wherein $R^{a1}$, $R^{a2}$, $R^{a3}$, $R^{a4}$ and $R^{a5}$ independently represent hydrogen or an optionally substituted alkyl or aryl group and $R^{a6}$ represents an optionally substituted alkyl or aryl group;

m=0 or 2;

LINK represents a divalent linking group;

the necessary counter ions are present to balance the charge.

The two different chromophoric groups in the cyanine dye according to Formula I are both heptamethine cyanine residues: the heptamethine cyanine residue having in meso position the —$S(O)_m$- substituent has its main absorption in IR radiation region while the heptamethine cyanine residue having in meso position the —$NR_9$—CHG- substituent has its main absorption in the visible light region. To ensure that the heptamethine cyanine residue with the —$NR_9$—CHG- meso substituent has an absorption in the visible region, $R_9$ may not be an electron withdrawing group.

The cyanine dye according to Formula I can be prepared by reacting two heptamethine cyanine precursors both comprising a leaving group in the meso-position, preferably a chloride leaving group, with a linking group having a H—$S(0)_m$-mercapto group on one side and an H—$NR_9$—CHG- amino group on the other side, as depicted in scheme 1.

Scheme 1

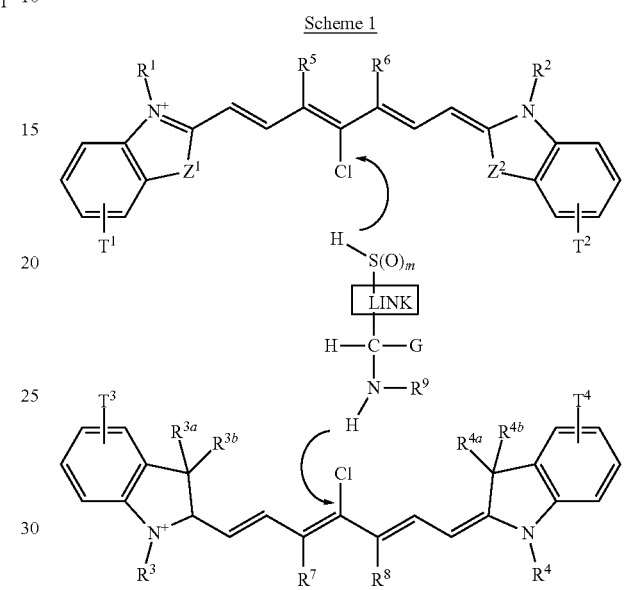

In a preferred embodiment, the two heptamethine cyanine precursors in Scheme 1 are identical. Also when both heptamethine cyanine precursors are identical, the different meso-substituents on the cyanine residues in the final dye (—$S(0)_m$- versus —$NR_9$—CHG-) ensure that the final dye absorbs both infrared radiation and visible light.

Another preferred cyanine dye has a structure according to Formula II;

Formula II

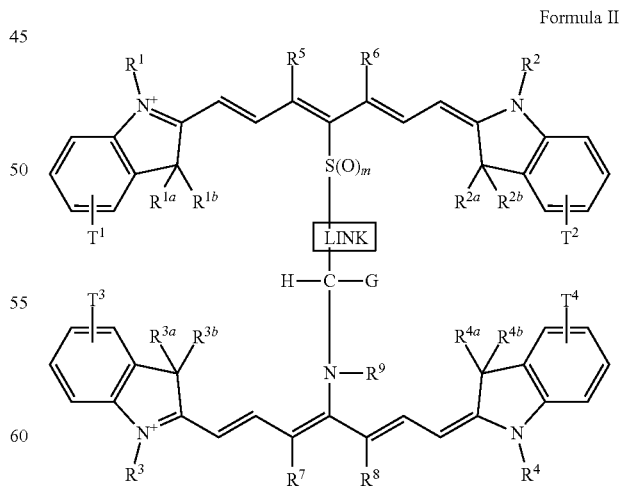

wherein

G, $R^{1a}$, $R^{1b}$, $R^{2a}$, $R^{2b}$, $R^{3a}$, $R^{3b}$, $R^{4a}$, $R^{4b}$, $R^1$ to $R^9$, $T^1$, $T^2$, $T^3$ and $T^4$ have the same meaning as in Formula I;

m=0 or 2;

LINK represents a divalent linking group;

the necessary counter ions are present to balance the charge.

Another preferred cyanine dye has a structure according to Formula III;

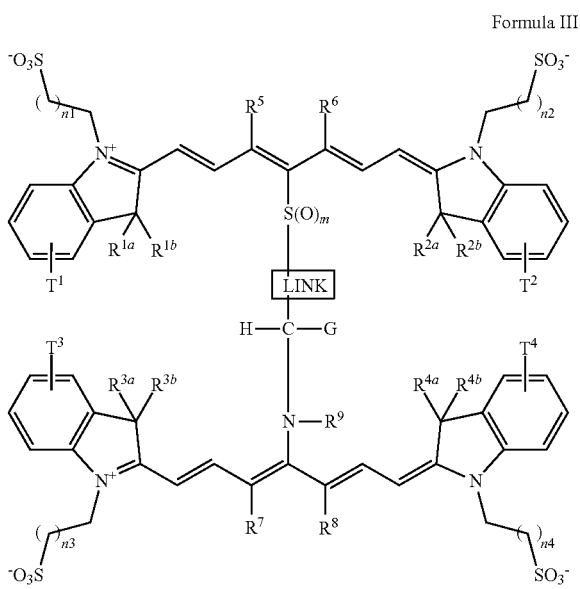
Formula III wherein

G, $R^{1a}$, $R^{1b}$, $R^{2a}$, $R^{2b}$, $R^{3a}$, $R^{3b}$, $R^{4a}$, $R^{4b}$, $R^5$ to $R^9$, $T^1$, $T^2$, $T^3$ and $T^4$ have the same meaning as in Formula I;

m=0 or 2;

n1, n2, n3 and n4 independently represent 1, 2 or 3;

LINK represents a divalent linking group;

the necessary counter ions are present to balance the charge.

Still another preferred cyanine dye has a structure according to Formula IV;

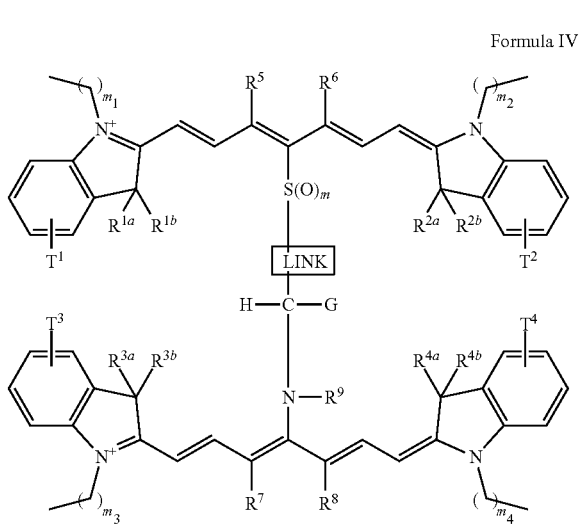
Formula IV wherein

G, $R^{1a}$, $R^{1b}$, $R^{2a}$, $R^{2b}$, $R^{3a}$, $R^{3b}$, $R^{4a}$, $R^{4b}$, $R^5$ to $R^9$, $T^1$, $T^2$, $T^3$ and $T^4$ have the same meaning as in Formula I;

m1, m2, m3 and m4 independently represent an integer ranging from 0-11;

m=0 or 2;

LINK represents a divalent linking group;

the necessary counter ions are present to balance the charge.

Still another preferred cyanine dye has a structure according to Formula V;

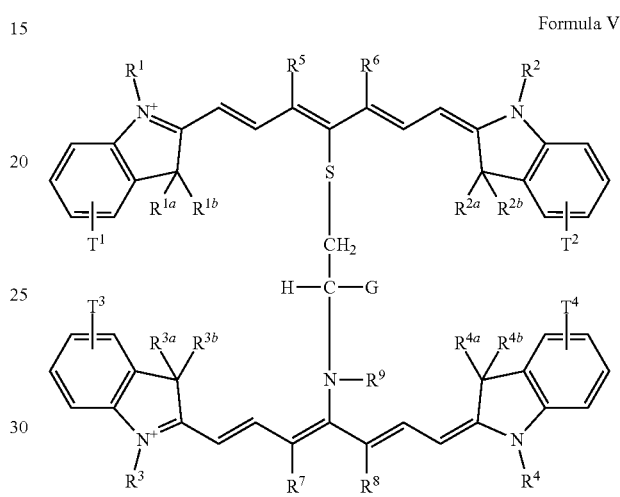
Formula V wherein

G, $R^{1a}$, $R^{1b}$, $R^{2a}$, $R^{2b}$, $R^{3a}$, $R^{3b}$, $R^{4a}$, $R^{4b}$, $R^1$ to $R^9$, $T^1$, $T^2$, $T^3$ and $T^4$ have the same meaning as in Formula I;

the necessary counter ions are present to balance the charge.

Still another preferred cyanine dye has a structure according to Formula VI;

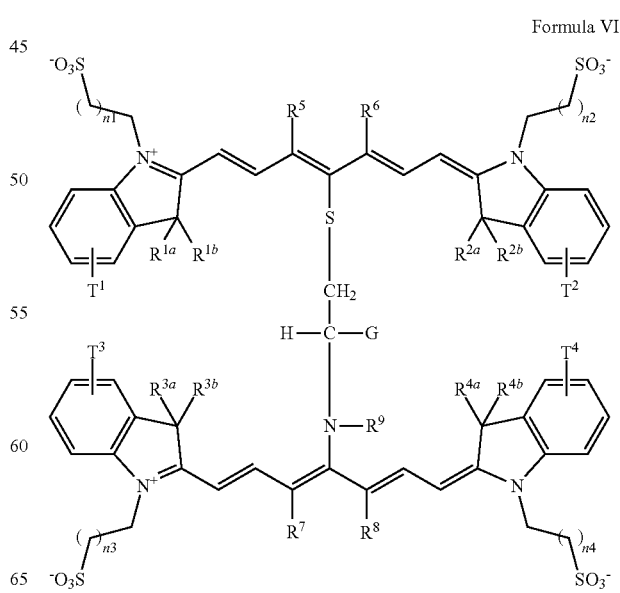
Formula VI wherein
G, $R^{1a}$, $R^{1b}$, $R^{2a}$, $R^{2b}$, $R^{3a}$, $R^{3b}$, $R^{4a}$, $R^{4b}$, $R^5$ to $R^9$, $T^1$, $T^2$, $T^3$ and $T^4$ have the same meaning as in Formula I;
n1, n2, n3 and n4 independently represent 1, 2 or 3;
the necessary counter ions are present to balance the charge.

Still another preferred cyanine dye has a structure according to Formula VII;

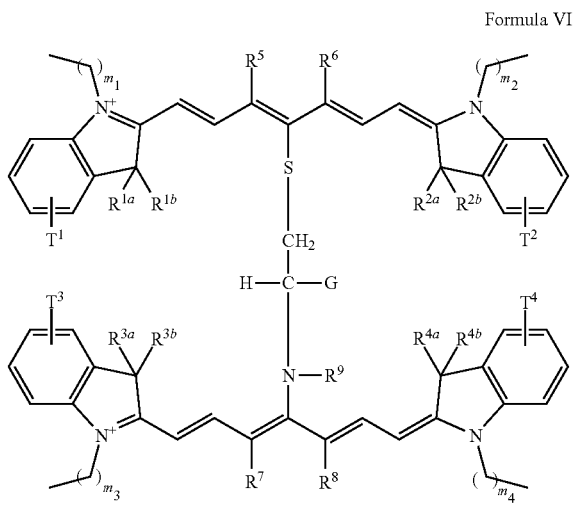

Formula VII wherein
G, $R^{1a}$, $R^{1b}$, $R^{2a}$, $R^{2b}$, $R^{3a}$, $R^{3b}$, $R^{4a}$, $R^{4b}$, $R^5$ to $R^9$, $T^1$, $T^2$, $T^3$ and $T^4$ have the same meaning as in Formula I;
m1, m2, m3 and m4 independently represent an integer ranging from 0-11;
the necessary counter ions are present to balance the charge.

Lithographic printing plate precursors comprising cyanine IR-dyes as disclosed in EP-A 2072570 may have an improved daylight stability. It is therefore preferred to use such heptamethine cyanine precursors to prepare dyes according to preferred embodiments of the present invention.

Still another preferred cyanine dye has a structure according to Formula VIII;

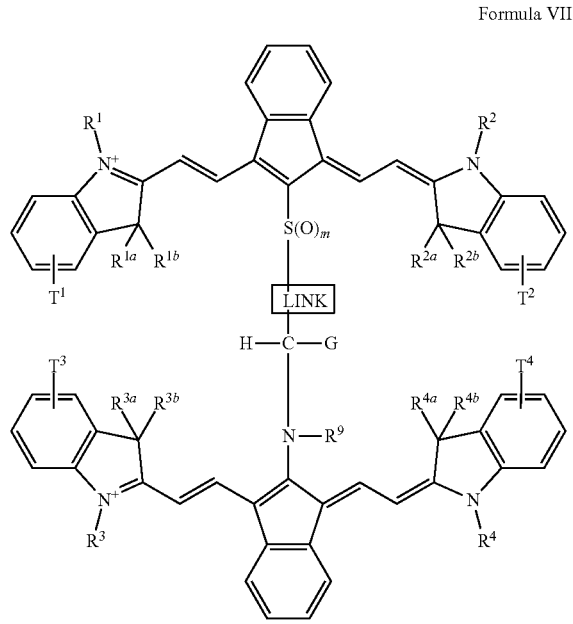

Formula VIII wherein
G, $R^{1a}$, $R^{1b}$, $R^{2a}$, $R^{2b}$, $R^{3a}$, $R^{3b}$, $R^{4a}$, $R^{4b}$, $R^1$ to $R^4$ and $R^9$, $T^1$, $T^2$, $T^3$ and $T^4$ have the same meaning as in Formula I;
m=0 or 2;
LINK represents a divalent linking group;
the necessary counter ions are present to balance the charge.

Still another preferred cyanine dye has a structure according to Formula IX;

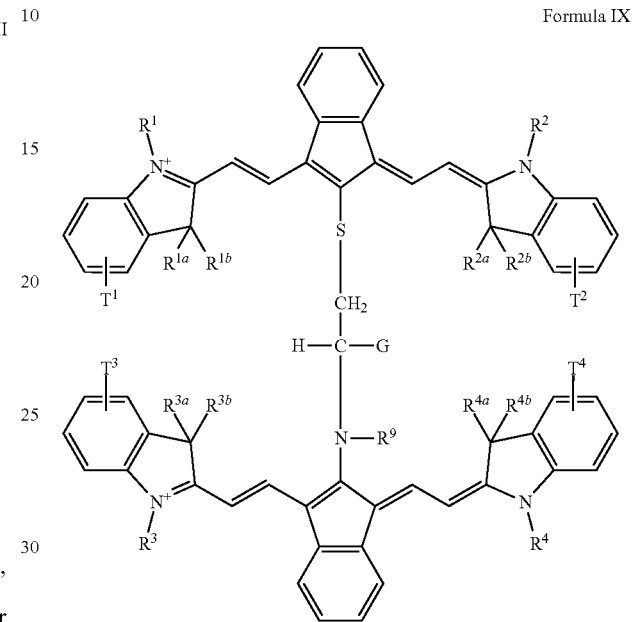

Formula IX wherein
G, $R^{1a}$, $R^{1b}$, $R^{2a}$, $R^{2b}$, $R^{3a}$, $R^{3b}$, $R^{4a}$, $R^{4b}$, $R^1$ to $R^4$ and $R^9$, $T^1$, $T^2$, $T^3$ and $T^4$ have the same meaning as in Formula I;
the necessary counter ions are present to balance the charge.

A particularly preferred cyanine dye has a structure according to Formula X;

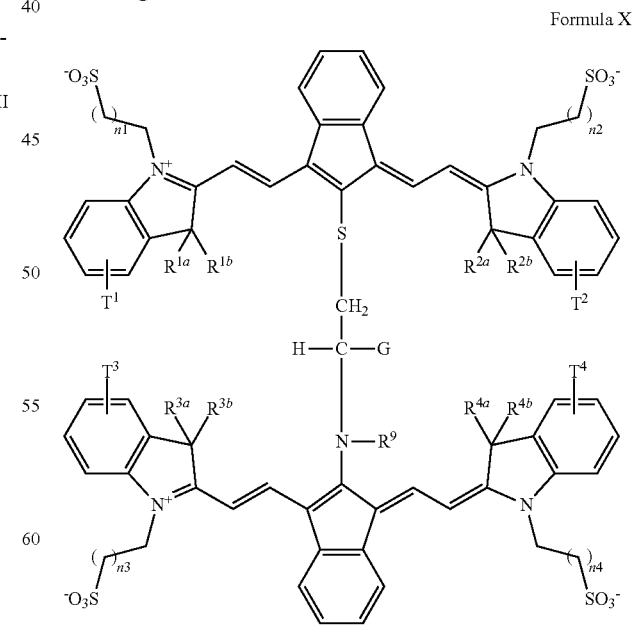

Formula X wherein
G, $R^{1a}$, $R^{1b}$, $R^{2a}$, $R^{2b}$, $R^{3a}$, $R^{3b}$, $R^{4a}$, $R^{4b}$, $R^9$, $T^1$, $T^2$, $T^3$, and $T^4$ have the same meaning as in Formula I;
n1, n2, n3 and n4 independently represent 1, 2 or 3;

the necessary counter ions are present to balance the charge.

Another particularly preferred cyanine dye has a structure according to Formula XI;

Formula XI

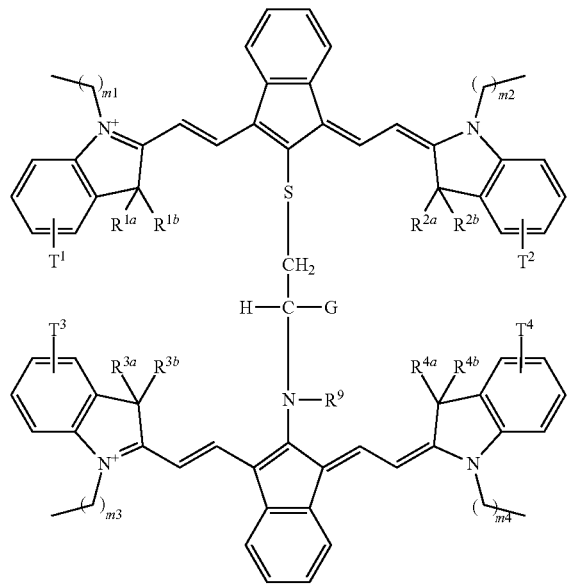

wherein
$G, R^{1a}, R^{1b}, R^{2a}, R^{2b}, R^{3a}, R^{3b}, R^{4a}, R^{4b}, R^9, T^1, T^2, T^3$ and $T^4$ have the same meaning as in Formula I;
m1, m2, m3 and m4 independently represent an integer ranging from 0-11;
the necessary counter ions are present to balance the charge.

Another particularly preferred cyanine dye has a structure according to Formula XII;

Formula XII

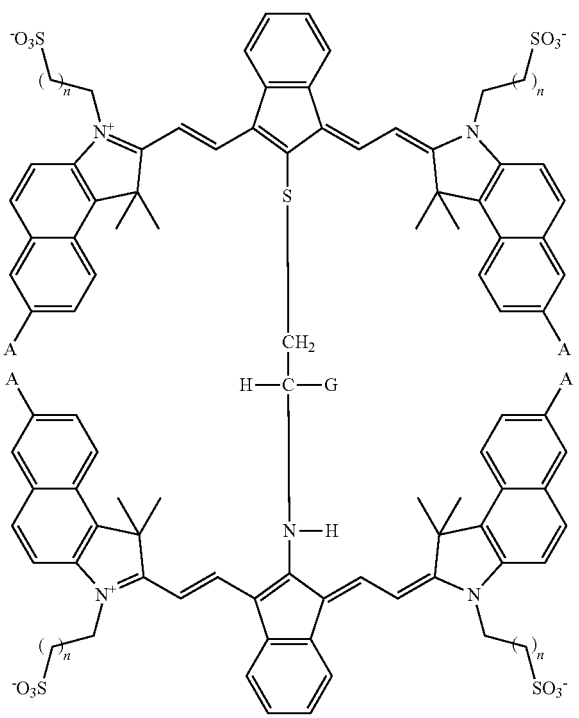

wherein
G has the same meaning as in Formula I;
n represents 1, 2 or 3;
A is H or Br;
the necessary counter ions are present to balance the charge.

Another particularly preferred cyanine dye has a structure according to Formula XIII;

Formula XIII

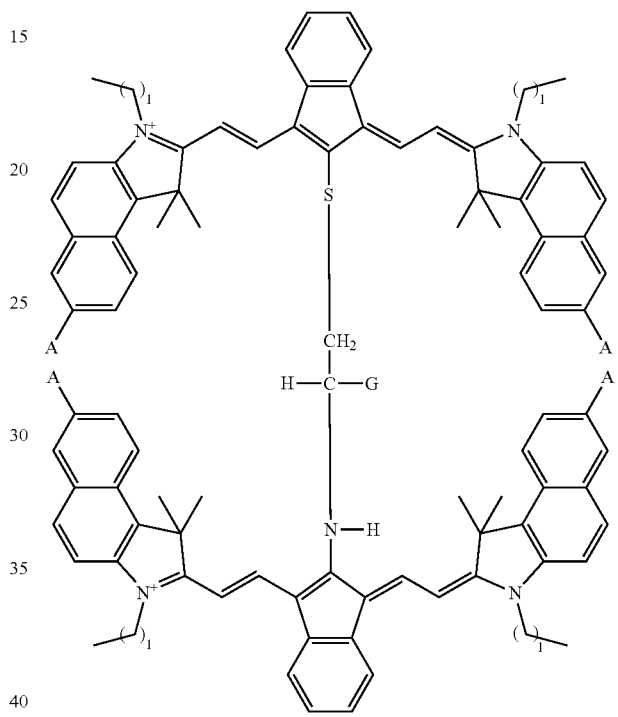

wherein
G has the same meaning as disclosed above;
l represents an integer ranging from 0 to 11;
A is H or Br;
the necessary counter ions are present to balance the charge.

As disclosed in the unpublished EP-A 08105354.8 (filed 2008-09-16), lithographic printing plate precursors comprising an IR cyanine dye having a Br-substituent, preferably on the heterocyclic end groups, may be characterized by an improved sensitivity. Therefore, it is preferred that A in formulae XII an XIII is bromide.

The necessary counter ion(s) to balance the charge of compounds according to Formulae I to XIII are either monovalent positive counter ion(s) such as for example $Li^+$, $K^+$, $Na^+$, $NH_4^+$, $H_3N(R^c)_1^+$, $H_2N(R^c)_2^+$, $HN(R^c)_3^+$, $N(R^c)_4^+$, wherein $R^c$ is an optionally substituted alkyl or (hetero)aryl group, or negative counter ion(s) such as for example $Cl^-$, $Br^-$, $I^-$, $CH_3SO_3^-$, $CF_3SO_3^-$, $CH_3$—$COO^-$, $CF_3$—$COO^-$ or a tosylate anion.

Examples of cyanine dyes according to preferred embodiments of the present invention are given in Table 1.

TABLE 1
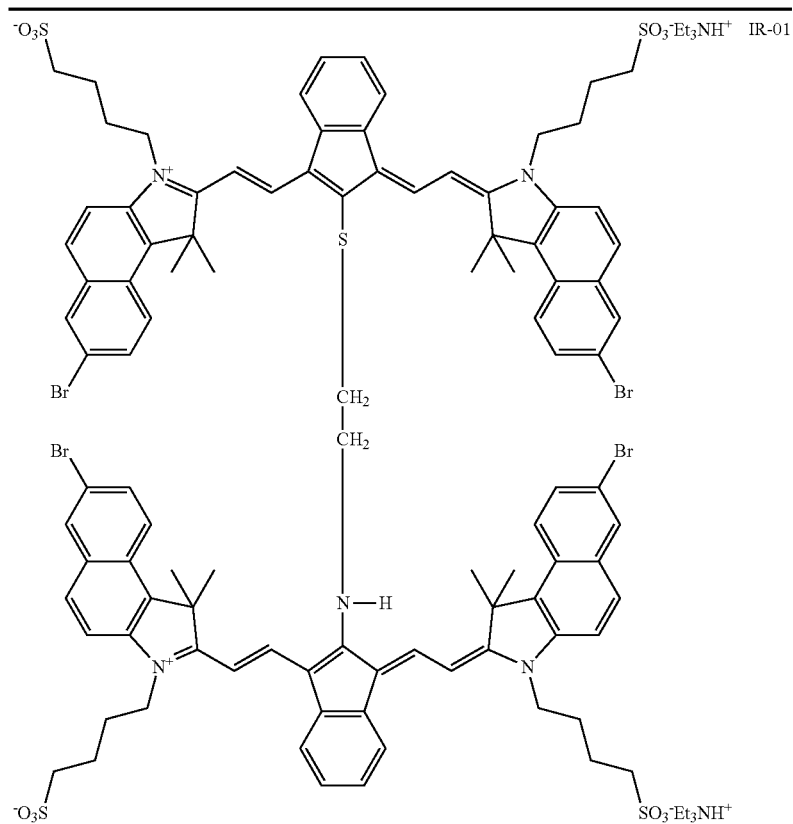
IR-01
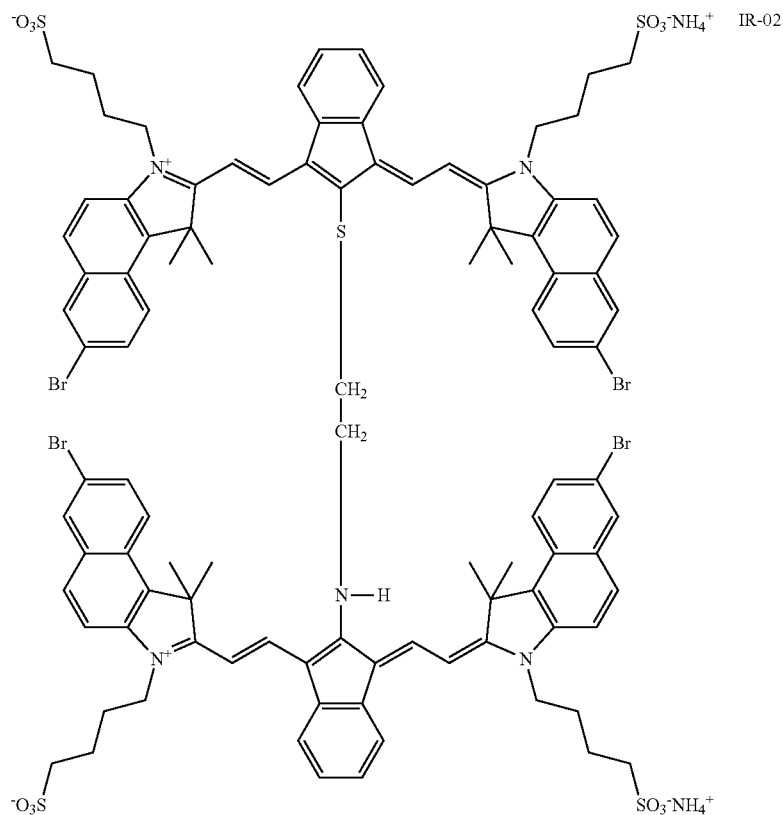
IR-02

TABLE 1-continued
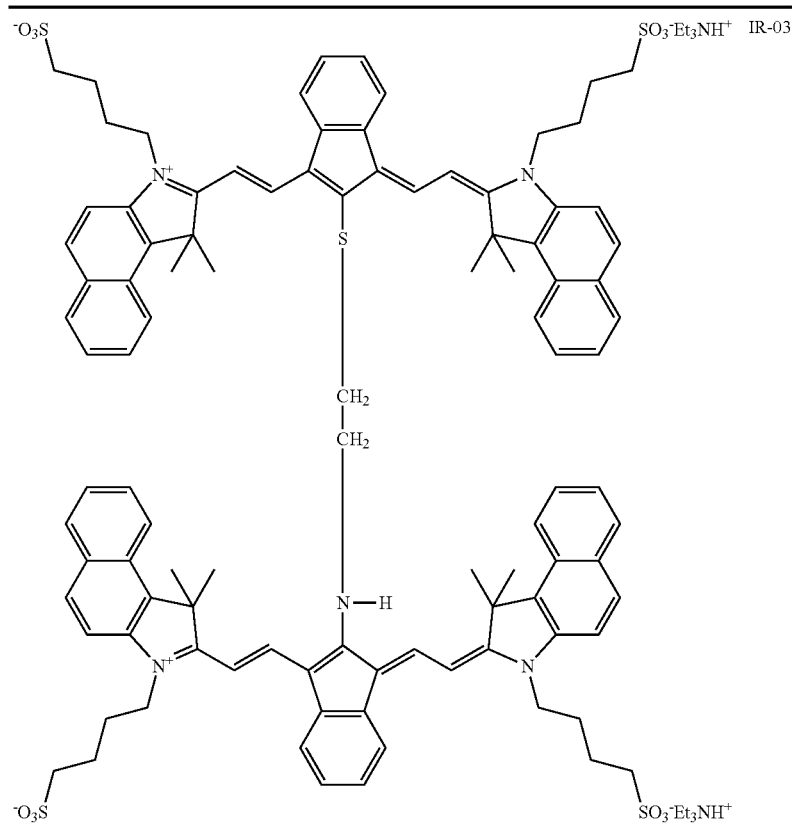
IR-03
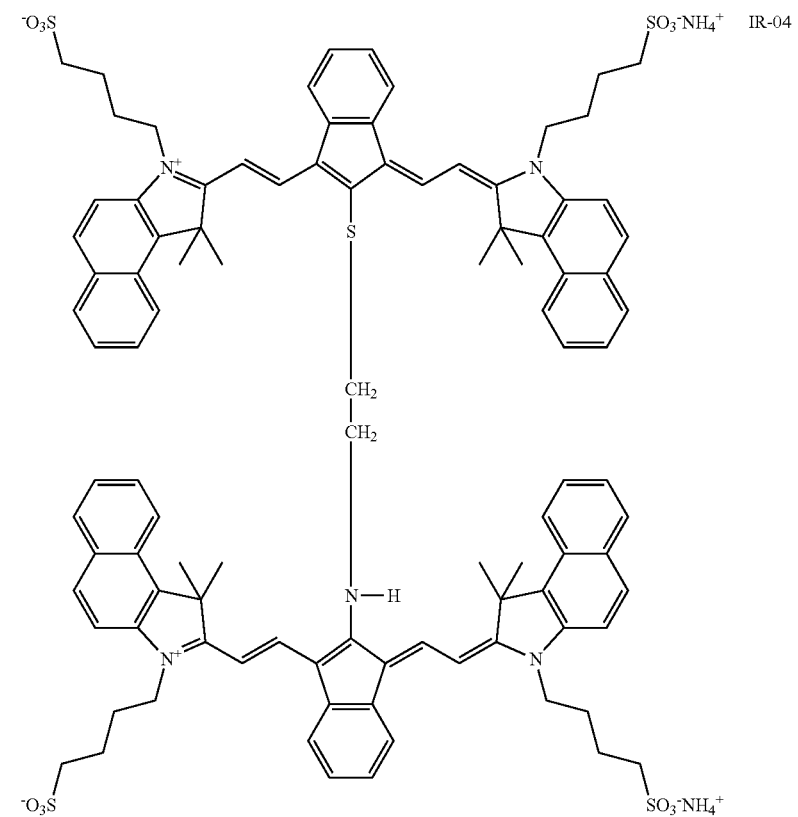
IR-04

TABLE 1-continued
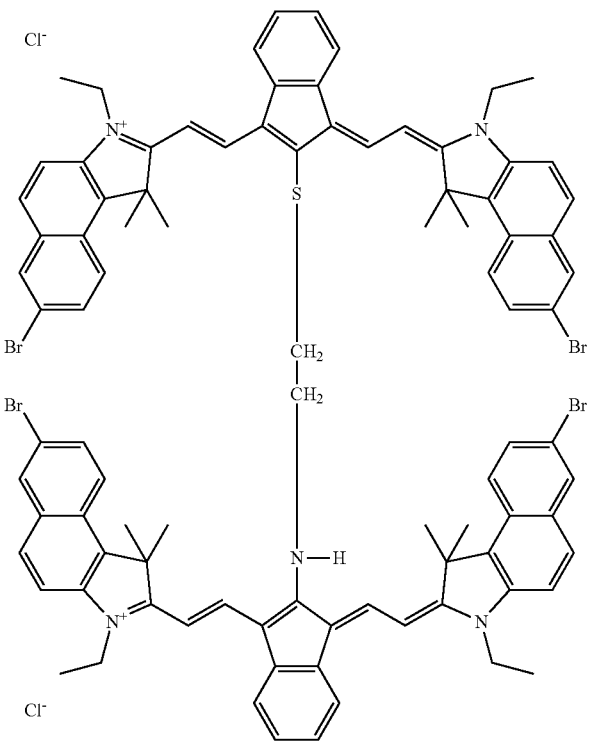 [SMILES: CCN1/C(=C/C=C2C(NCCSC3=C(/C=C/C4=[N+](CC)c5ccc6cc(Br)ccc6c5C4(C)C)c4ccccc4/C3=C\C=C3\N(CC)c4ccc5cc(Br)ccc5c4C3(C)C)=C(/C=C/C3=[N+](CC)c4ccc5cc(Br)ccc5c4C3(C)C)c3ccccc3/2)C(C)(C)c2c1ccc1cc(Br)ccc21 ; [Cl-] ; [Cl-]]
IR-05
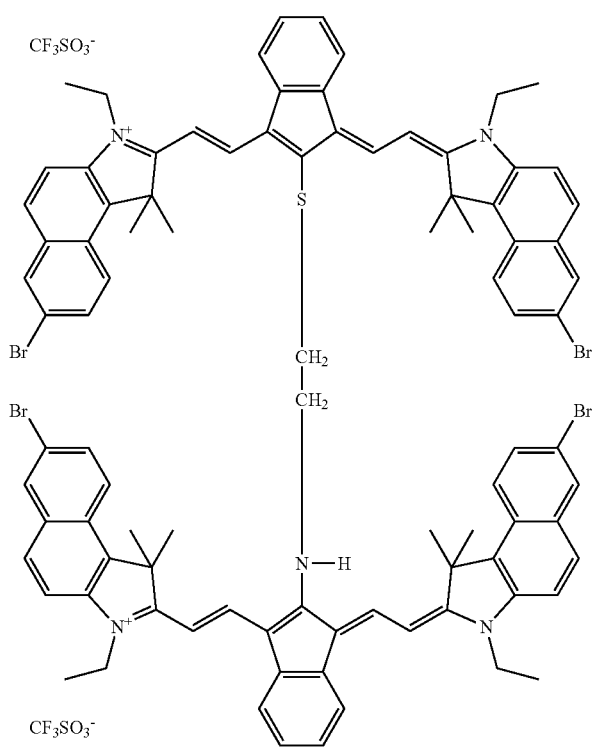 [SMILES: "CF3SO3-" ; "CF3SO3-" ; CCN1/C(=C/C=C2C(NCCSC3=C(/C=C/C4=[N+](CC)c5ccc6cc(Br)ccc6c5C4(C)C)c4ccccc4/C3=C\C=C3\N(CC)c4ccc5cc(Br)ccc5c4C3(C)C)=C(/C=C/C3=[N+](CC)c4ccc5cc(Br)ccc5c4C3(C)C)c3ccccc3/2)C(C)(C)c2c1ccc1cc(Br)ccc21]
IR-06

TABLE 1-continued
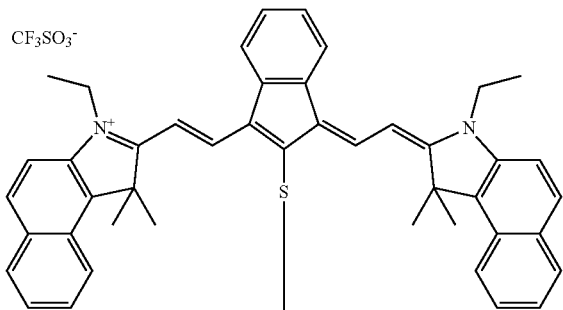
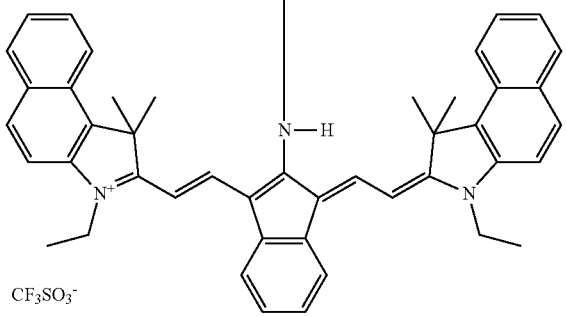
IR-07
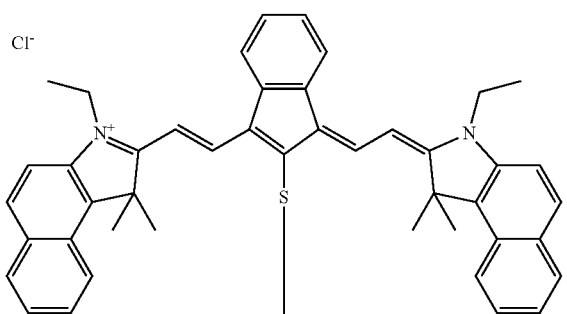
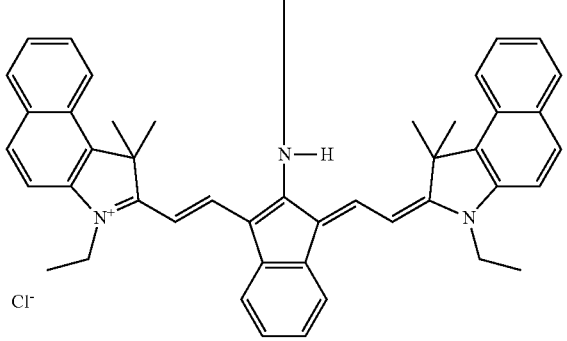
IR-08

TABLE 1-continued
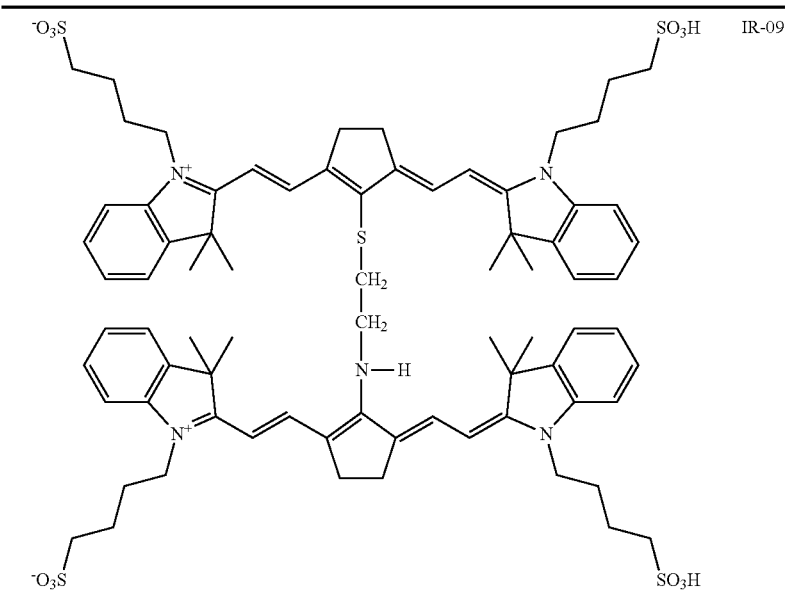
IR-09
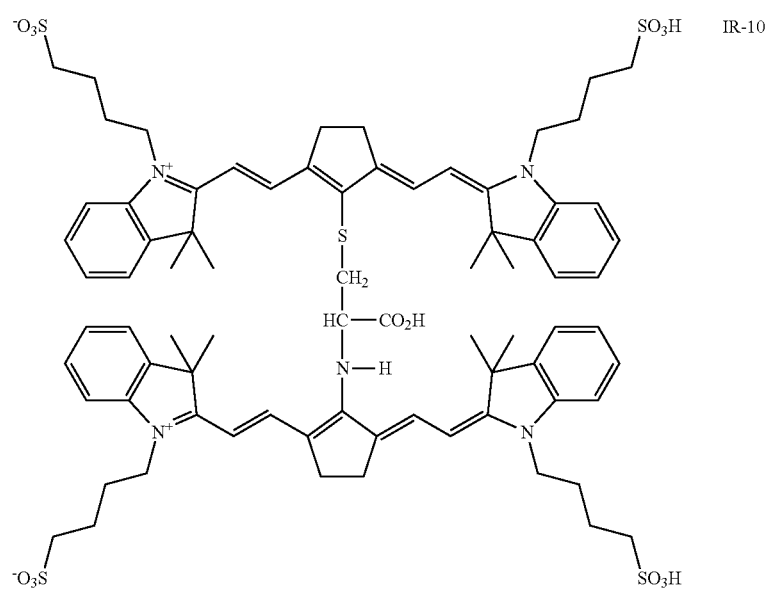
IR-10
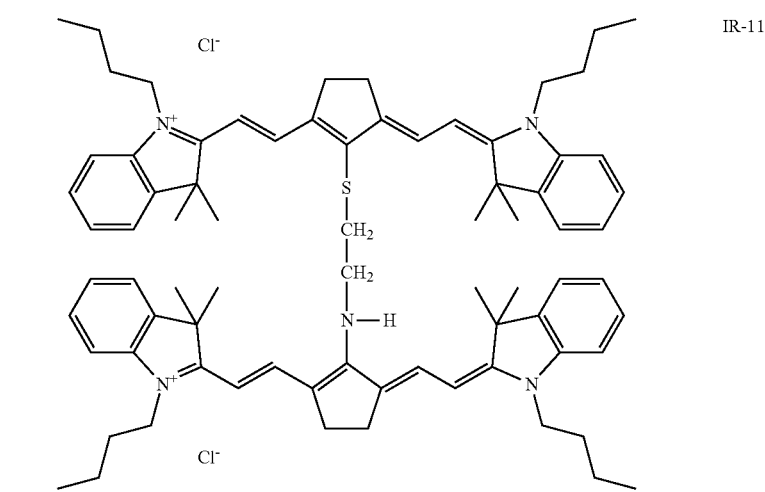
IR-11

TABLE 1-continued

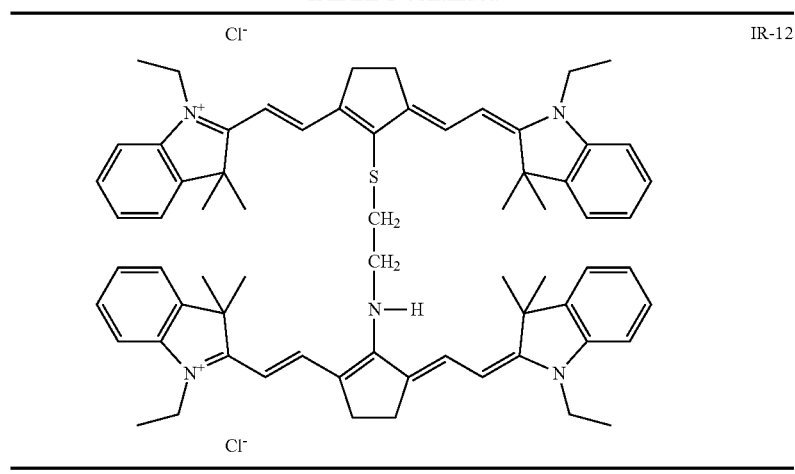

IR-12

Lithographic Printing Plate Precursor

The lithographic printing plate precursor according to a preferred embodiment of the present invention comprises a cyanine dye having two different chromophoric groups, a chromophoric group that has its main absorption in the infrared region, i.e. radiation having a wavelength in the range from 750 to 1500 nm, and another chromophoric group that has its main absorption in the visible light region, i.e. in the range from 400 to 700, preferably in the range from 550 to 700 nm. Preferably the first chromophoric group has its absorption maximum in the infrared region while the second chromophoric group has its absorption maximum in the range from 550 to 700 nm.

Preferably, the cyanine dye has a structure according to Formulae I to XIII. However, depending on the coating composition used to prepare the plates, different structures of the dyes may be preferred. For example, it is preferred that in negative working lithographic printing plate precursors comprising thermoplastic polymer particles, anionic cyanine dyes are used such as those according to Formulae III, VI, X and XII. Such dyes are more compatible with the aqueous coating solution and the polymer particles typically used in the preparation of these precursors. On the contrary, in negative working photopolymer printing plate precursors or in positive working lithographic printing plate precursors, it is preferred to use cationic or zwitterionic cyanine dyes, such as those according to Formulae IV, VII, XI and XIII. Such dyes are more compatible with the non-aqueous coating solutions typically used in the preparation of such precursors.

In a lithographic printing plate according to a preferred embodiment of the present invention, the cyanine dye as described above may be used in combination with other, more conventional, IR-dyes and/or contrast dyes.

Positive Thermal Plates

Positive thermal plates form an image by a heat-induced solubility increase in a developer of the exposed areas of the coating. The coating typically comprises an oleophilic binder, e.g. a phenolic resin, of which the rate of dissolution in the developer is increased by the image-wise exposure. During processing, the solubility differential leads to the removal of the non-printing areas of the coating, thereby revealing the hydrophilic support, while the printing areas of the coating remain on the support. Typical examples of such plates are described in e.g. EP-As 823327, 825927, 864420 and 901902. To optimize the chemical resistance of the printing areas, additional binders may be used together with the phenolic resin either in the same layer or in different layers as disclosed in for example EP-As 894622, 909657, 1011970 and 1826001. Also, to obtain better physical resistance of the printing areas, a polyvinylacetal binder may be used instead of or in addition to a phenolic resin as disclosed in for example EP-As 1208014 and 1603749 and WOs 2008/103258 and 2008/106010. Such positive thermal plates are typically developed in an alkaline developer. However, as disclosed in WO 2009/094120, also non-alkaline solutions may be used.

Negative Thermal Plates

The dye according to a preferred embodiment of the present invention may be used in negative working thermal photopolymer plates but are preferably used in negative working thermal plate precursors comprising thermoplastic polymer particles of which the imaging mechanism is based on coalescence of those polymer particles.

Preferred IR sensitive photopolymer printing plate precursors are disclosed in WO 2005/111727, EP-As 1788448 and 1788449 and WO 2009/063024. Other IR sensitive photopolymer printing plate precursors that may be used in the method of the present invention are those disclosed in EP-As 1602982, 1621339, 1630618 and 1695822.

A particularly preferred IR sensitive printing plate precursors is disclosed in the unpublished EP-A 08167404.6 (filed 2008-10-23).

Negative working thermal sensitive printing plate precursors comprising thermoplastic polymer particles, of which the imaging mechanism is based on coalescence or coagulation of the polymer particles, have been disclosed in several applications. For example EP-As 770494, 770495, 770496 and 770497 disclose printing plate precursors comprising thermoplastic polymer particles which are, after exposure, processed on press by supplying ink and/or fountain solution. EP-A 1342568 and WO2006/037716 disclose a method of making a lithographic printing plate wherein a precursor comprising thermoplastic polymer particles is, after exposure, processed in a gum solution. EP-As 1614539 and 1614540 disclose a method of making a lithographic printing plate wherein a precursor comprising thermoplastic polymer particles is, after exposure, processed in an alkaline solution. Other preferred precursors are disclosed in the unpublished EP-A 08105354.8 (filed on 2008-09-16) and the EP-As 2072570, 1859935, 1859936 and 1914069. These precursors typically comprise a coating provided on a support having a hydrophilic surface, the coating comprising thermoplastic polymer particles, an IR dye and a contrast dye and/or pigment. These precursors may be developed with a mildly alkaline solution, a non-alkaline solution such as a gum solution or on press by supplying ink and/or fountain.

EXAMPLES

All materials used in the examples were readily available from standard sources such as Aldrich Chemical Co. (Belgium) and Acros (Belgium) unless otherwise specified.

In the following list, ingredients used in the examples are listed. Where appropriate, it is mentioned how the ingredient (as a solution, as a dispersion etc.) is used in the examples.

HEDP, an aqueous solution containing 6 wt. % 1-hydroxyethylidene-1,1-diphosphonic acid from Solutia.

ZONYL FS0100, an aqueous solution containing 5 wt. % of the fluorinated surfactant ZONYL FS0100 from Dupont.

Contrast Pigment, an aqueous blue pigment dispersion from Cabot Corporation containing 5 wt. % of the modified Cu phthalocyanine pigment IJX883.

Binder, an aqueous solution containing 1.5 wt. % Aqualic AS58 from Nippon Shokubai.

Contrast Dye, an aqueous solution (ethanol/water 50/50) containing 1.0 wt. % of the following dye:

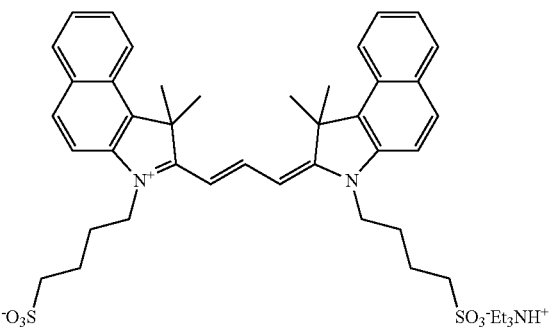

TD1000, a developer from Agfa Graphics N.V.

RC795, a gum solution available from Agfa Graphics N.V.

CIR-01, a 1 wt. % ethanol/water (1/1) solution of the following comparative IR-dye:

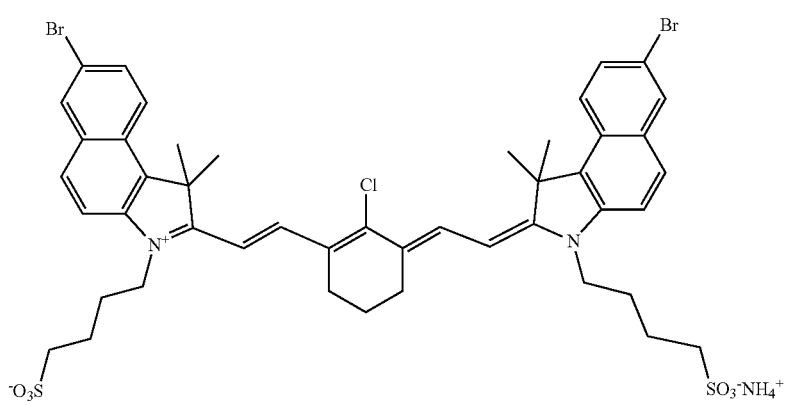

IR-01, a 1 wt. % ethanol/water (1/1) solution of the following dye:

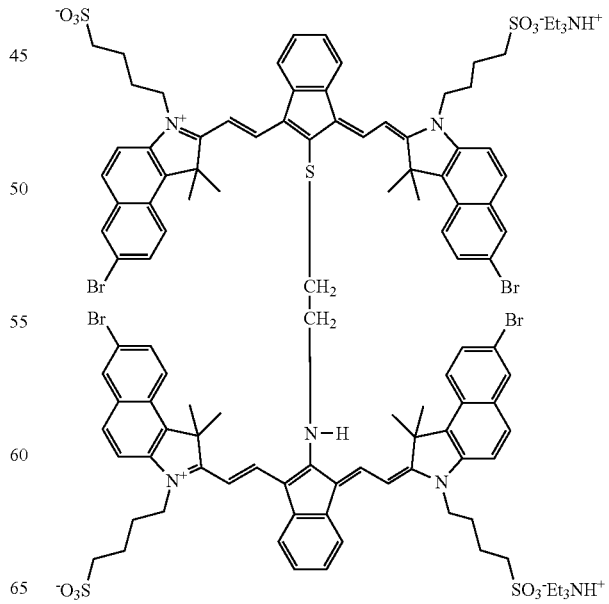

Example 1

Preparation of Aluminium Substrate AS-01

A 0.30 mm thick aluminium foil was degreased by spraying with an aqueous solution containing 34 g/l NaOH at 70° C. for 6 seconds and was rinsed with demineralised water for 3.6 seconds. The foil was then electrochemically grained during 8 seconds using an alternating current in an aqueous solution containing 15 g/l HCl, 15 g/l $SO_4^{2-}$ ions and 5 g/l $Al^{3+}$ ions at a temperature of 37° C. and a current density of about 100 A/dm$^2$ (charge density of about 800 C/dm$^2$). Afterwards, the aluminium foil was desmutted by etching with an aqueous solution containing 145 g/l of sulphuric acid at 80° C. for 5 seconds and rinsed with demineralised water for 4 seconds. The foil was subsequently subjected to anodic oxidation during 10 seconds in an aqueous solution containing 145 g/l of sulphuric acid at a temperature of 57° C. and a current density of 33 A/dm$^2$ (charge density of 330 C/dm$^2$), then washed with demineralised water for 7 seconds and finally dried at 120° C. for 7 seconds.

The support thus obtained is characterised by a surface roughness Ra of 0.35-0.4 μm (measured with interferometer NT1100) and an anodic weight of about 4.0 g/m$^2$.

Synthesis of the Latex LX-01

The polymer emulsion was prepared by means of a seeded emulsion polymerisation using as monomers styrene and acrylonitrile. All surfactant (4.5% towards the total monomer amount) was present in the reactor before the monomer was added. In a double-jacketed reactor of 2 liter, 10.35 g of Chemfac PB133 (an alkyl ether phosphate surfactant from Chemac Inc., Greenville, USA), 1.65 g NaHCO$_3$ and 1482.1 g of demineralised water was added. The reactor was flushed with nitrogen and heated until 75° C. When the reactor content reached a temperature of 75° C., 1.5% of the monomers were added (i.e. a mixture of 2.29 g styrene and 1.16 g acrylonitrile). The monomer was emulsified during 15 minutes at 75° C. and subsequently 37.95 g of a 2% solution of sodium persulfate in water was added. The reactor was subsequently heated to a temperature of 80° C. during 30 minutes. Then the remaining monomer mixture (150.1 g of styrene and 76.5 g of acrylonitrile) was dosed during 180 minutes. Simultaneously with the monomer addition an additional aqueous persulfate solution was added (37.95 g of a 2% aqueous Na$_2$S$_2$O$_8$ solution). After the monomer addition was finished the reactor was heated for 60 minutes at 80° C. To reduce the amount of residual monomer a vacuum destillation was performed at 80° C. during 1 hour. The reactor was subsequently cooled to room temperature, 100 ppm Proxel Ultra (an aqueous 5 wt. % solution of 1.2 benzisothiazole-3 (2H)-one from Arch Biocides UK) was added as biocide and the latex was filtered using coarse filter paper.

This resulted in a latex dispersion with a solid content of 13.14% and a pH of 6.10. The average particle size was 29 nm as measured using PL-PSDA (Polymer Laboratories Particle Size Diameter Analyser). Measured with BI-90 this resulted in a mean particle size of 31 nm.

Synthesis of IR-01

IR-absorber IR-01 has been synthesized according to Scheme 2.

Triethylamine (27.7 ml) was added to a stirred suspension of INT-1 (112 g, prepared according to EP2072570) and INT-2 (cysteamine hydrochloride) (5.68 g) in methanol (400 ml) at room temperature. After heating for 30 minutes at 60° C., the reaction mixture was cooled to room temperature and ethyl acetate (2000 ml) was added. After stirring for 2 hours, the precipitated IR-01 was filtered. After digesting with ethyl acetate (500 ml) and drying in vacuo, 103.2 g of IR-01 (yield of 92%) was obtained as a purple-black powder. The absorption maxima of IR-01 in methanol are 635 and 775 nm.

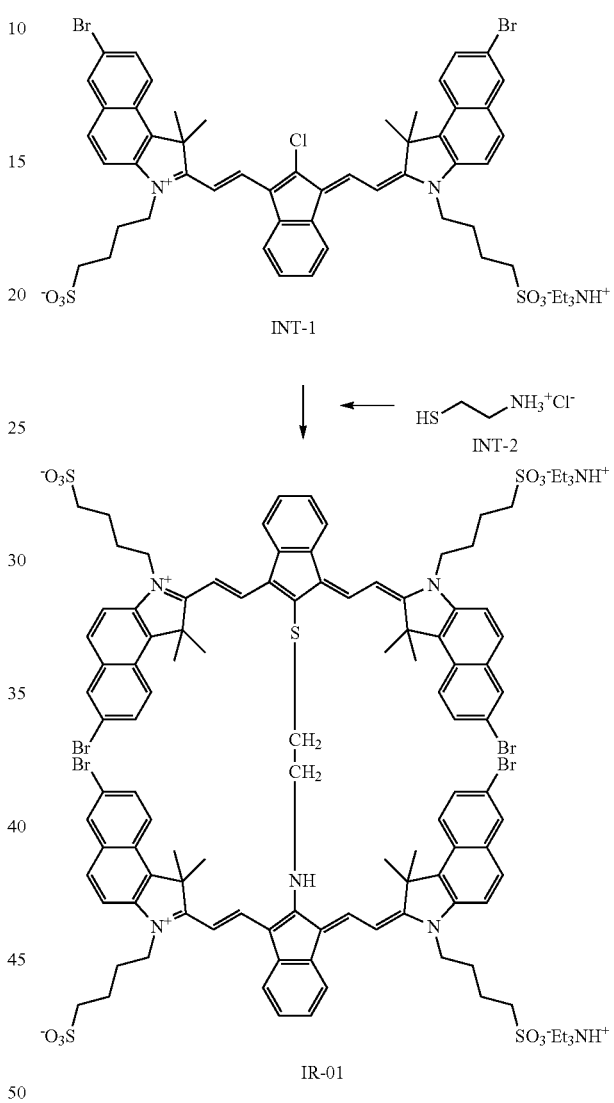

Scheme 2

Printing Plate Precursors PPP-01 and PPP-02

The coating solutions of the printing plate precursors PPP-01 and PPP-02 were prepared using the materials as described above. The IR-dye was added as a 1 wt. % solution in water/ethanol (1/1). The pH of the coating solution was adjusted to 4.1 with a diluted ammonia solution (ca. 3 wt. %). The coating solutions were coated on the aluminium substrate AS-01 with a coating knife at a wet thickness of 30 μm. After drying at 60° C. the printing plate precursors PPP-01 and PPP-02, of which the dry coating weight of the different components is given in Table 2, were obtained. The dry coating weights used in Table 2 refer to the weight of the ingredients as such and not to the weight of the solutions or dispersions of the ingredients, i.e. those mentioned in the material list above, used to prepare the precursors.

TABLE 2

| Ingredients (g/m²) | PPP-01 (COMP) | PPP-02 (INV) |
|---|---|---|
| LX-01 | 0.3993 | 0.3993 |
| CIR-01 | 0.0654 | — |
| IR-01* | — | 0.1464 |
| Contrast Pigment | 0.0200 | — |
| Contrast Dye | 0.0090 | — |
| Binder | 0.0261 | 0.0261 |
| HEDP | 0.0150 | 0.0150 |
| ZONYL FS0100 | 0.0050 | 0.0050 |
| Total | 0.5398 | 0.5918 |

The amount of IR-01 in the coating composition of PPP-02 was adapted so as to result in the same molar concentration as of CIR-01 in the coating composition of PPP-01.

Exposure, Development and Printing of PPP-01 and PPP-02.

The printing plate precursors PPP-01 and PPP-02 were exposed on a Creo TrendSetter 3244 (40 W head) IR-laser platesetter at 210-180-150-120-90 mJ/cm² at 150 rotations per minute (rpm) with a 200 line per inch (lpi) screen and an addressability of 2400 dpi.

After exposure the printing plate precursors were developed in a VA88 processor (from Agfa Graphics NV) with TD1000 developer at 22° C. in the developer section and a 1:1 with water diluted RC795 gum solution at 22° C. in the gumming section. The development speed amounted to 1.2 m/min.

After development and gumming the printing plates were mounted on a Heidelberg GT052 printing press equipped with a Kompac III dampening system. A compressible blanket was used and printing was done with the fountain solution 4% Agfa Prima FS4014 (from Agfa Graphics NV) and K⁺ E 800 black ink (from BASF). The following start-up procedure was used: first 5 revolutions with the dampening form rollers engaged, then 5 revolutions with both the dampening and ink form rollers engaged, then printing started. 1000 prints were made on 80 g/m² offset paper.

Evaluation of the Performance of PPP-01 and PPP-02

The printing plate precursors are evaluated through the following characteristics:

Clean-Out (Printed Sheet) 1;

After 750 prints, the paper sheet size is shortened and printing is continued for another 250 prints. After 1000 prints, a few more prints are generated on the normal paper size. If any staining should occur, this will result in an accumulation of ink on the blanket, while printing is performed with the shortened paper size. This accumulated ink will then be transferred to the paper when the normal paper size is used again, after 1000 prints. This method allows for a very precise evaluation of the stain level. A value of 5.0 indicates that no stain is observed after 1 000 prints. A value of 4.0 would be barely acceptable. A value of 3.0 would be totally unacceptable for high quality print jobs.

Sensitivity 1;

Plate sensitivity (2% dot) (mJ/cm²)=the lowest exposure energy density at which 2% dots are perfectly visible (by means of a 5× magnifying glass) on the one-thousandth (1000$^{th}$) print on paper.

Sensitivity 2;

Plate sensitivity (B-25 2%) (mJ/cm²)=the interpolated energy density value where the surface coverage (calculated from the measured optical density of the one-thousandth print on paper) of a B-25 2% dot patch equals 55%. A B-25 2% dot patch consists of 2% ABS (200 lpi, 2400 dpi) dots, but the total surface coverage of these dots is 25%. ABS dots are generated with the Agfa Balanced Screening methodology.

The optical densities referred to above are all measured with a GretagMacbeth densitometer type D19C. The Lab value measurements were performed using a Gretag SPM50 spectrophotometer from GretagMacBeth.

The results are given in Table 3.

TABLE 3

| PPP | PPP-01 (COMP) | PPP-02 (INV) |
|---|---|---|
| Clean-out (printed sheet) 1 | 4.5 | 4.5 |
| Sensitivity 1 | 120 | 120 |
| Sensitivity 2 | 188 | 165 |

From Table 3 it is clear that both printing plate precursors PPP-01 and PPP-02 perform very similarly.

Ageing of PPP-01 and PPP-02

The printing plate precursors PPP-01 and PPP-02 were subsequently stored during 7 days in a warm and humid cabinet (35° C./80% R.H.). This resulted in so-called "aged" printing plate precursors (vs. the original "fresh" printing plate precursors).

Exposure, Development and "Aged" PPP-01 and PPP-02

The "aged" printing plate precursors PPP-01 and PPP-02 were exposed, developed and printed in exactly the same way as the "fresh" printing plate precursors before.

Evaluation of the Performance of "Aged" PPP-01 and PPP-02

The "aged" printing plate precursors are evaluated through the a so-called Clean-out (printed sheet) 2.

Clean-Out (Printed Sheet) 2;

Printed sheet 250 of the aged printing plates (after 7 days ageing at 35° C./80% R.H.) was evaluated according to the following qualitative scale:

5="no toning" (unwanted ink acceptance in the non-image areas) or in other words, D (non-image areas) lower than or equal than 0.025

4=D (non-image areas) higher than 0.025 but lower than or equal to 0.08

3=D (non-image areas) higher than 0.08 but lower than or equal to 0.15

2=D (non-image areas) higher than 0.15 but lower than or equal to 0.35

1=D (non-image areas) higher than 0.35 but lower than or equal to 1.2

0="black page" or in other words, D (non-image areas) higher than 1.2

The optical densities referred to above are all measured with a Gretag Macbeth densitometer type D19C.

The results are given in Table 4.

TABLE 4

| PPP | PPP-01 (COMP) | PPP-02 (INV) |
|---|---|---|
| Clean-out (printed sheet) 2 | 3 | 4.5 |

From Table 4 it is clear that printing plate precursor PPP-02 according to a preferred embodiment of the present invention shows a better clean-out performance after ageing.

The invention claimed is:

1. A lithographic printing plate precursor comprising:
a cyanine dye including a first chromophoric group and a second chromophoric group that are different from each other; wherein the first chromophoric group has a main absorption in the infrared region;

the second chromophoric group has a main absorption in the visible light region; and the cyanine dye has a structure according to Formula I:

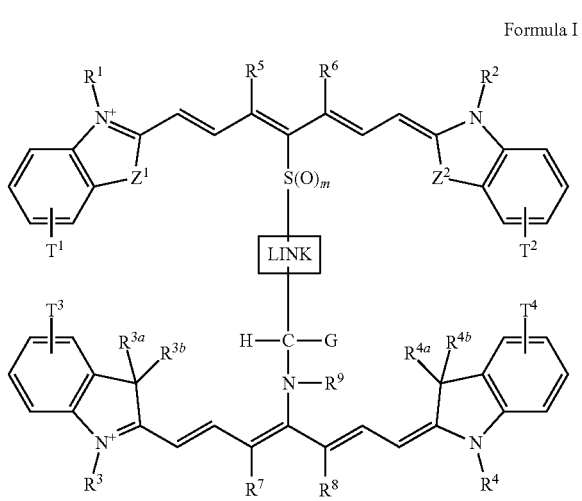

Formula I wherein $Z^1$ represents S, $CR^{1a}R^{1b}$, or —CH=CH—;

$Z^2$ represents S, $CR^{2a}R^{2b}$, or —CH=CH—;

G represents H, $CO_2R$ or CONR'R";

R, R', and R" independently represent H or an optionally substituted alkyl, aralkyl, or aryl group;

$R^{1a}$, $R^{1b}$, $R^{2a}$, $R^{2b}$, $R^{3a}$, $R^{3b}$, $R^{4a}$, and $R^{4b}$ independently represent an optionally substituted alkyl, aralkyl, or aryl group, and $R^{1a}$ and $R^{1b}$, $R^{2a}$ and $R^{2b}$, $R^{3a}$ and $R^{3b}$, $R^{4a}$ and $R^{4b}$ are capable of forming a ring;

$R^1$, $R^2$, $R^3$, and $R^4$ independently represent an optionally substituted alkyl group;

$R^5$, $R^6$, $R^7$, and $R^8$ independently represent hydrogen or an optionally substituted alkyl or aryl group, and $R^5$ and $R^6$, $R^7$ and $R^8$ are capable of forming a ring;

$R^9$ represents hydrogen or an optionally substituted alkyl group;

$T^1$, $T^2$, $T^3$, and $T^4$ independently represent H, F, Cl, Br, I, $CF_3$, CN, an optionally substituted alkyl, alkoxy, or aryl group, an optionally substituted annulated benzo ring, —$CO_2R^{a1}$, —$CONR^{a2}R^{a3}$, —$SO_2NR^{a4}R^{a5}$, —$SO_2R^{a6}$, or —$SO_3^-$, and $R^{a1}$, $R^{a2}$, $R^{a3}$, $R^{a4}$, and $R^{a5}$ independently represent hydrogen or an optionally substituted alkyl or aryl group and $R^{a6}$ represents an optionally substituted alkyl or aryl group;

m=0 or 2;

LINK represents a divalent linking group; and counter ions are present to balance a charge of the cyanine dye.

2. The lithographic printing plate precursor according to claim 1, wherein the cyanine dye has a structure according to Formula II:

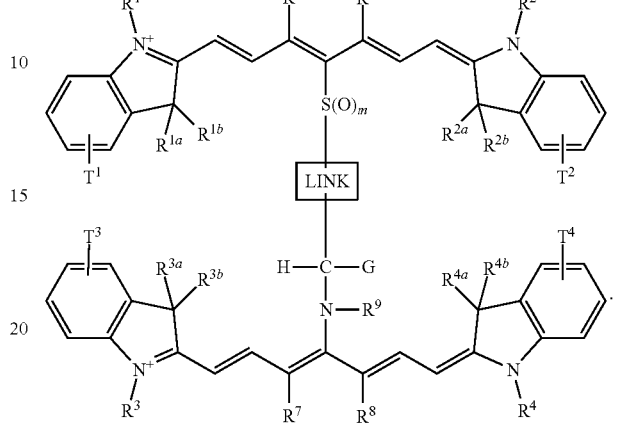

Formula II

3. The lithographic printing plate precursor according to claim 2, wherein the cyanine dye has a structure according to Formula III:

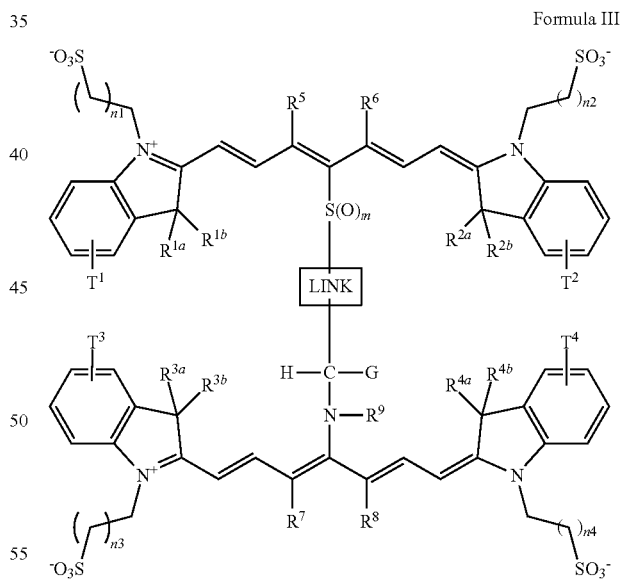

Formula III wherein n1, n2, n3, and n4 independently represent 1, 2, or 3.

4. The lithographic printing plate precursor according to claim 3, wherein the cyanine dye has a structure according to Formula VI:

Formula VI

5. A negative working lithographic printing plate precursor comprising:

the cyanine dye as defined in claim 4; and thermoplastic polymer particles.

6. A negative working lithographic printing plate precursor comprising:

the cyanine dye as defined in claim 3; and thermoplastic polymer particles.

7. A lithographic printing plate precursor according to claim 2, wherein the cyanine dye has a structure according to Formula V:

Formula V

8. The lithographic printing plate precursor according to claim 2, wherein the cyanine dye has a structure according to Formula VIII:

Formula VIII

9. The lithographic printing plate precursor according to claim 8, wherein the cyanine dye has a structure according to Formula X:

Formula X

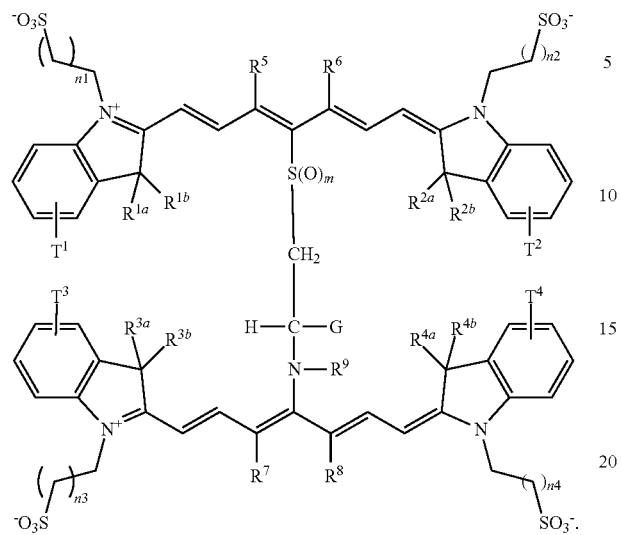

wherein n1, n2, n3, and n4 independently represent 1, 2, or 3.

10. The lithographic printing plate precursor according to claim 9, wherein the cyanine dye has a structure according to Formula XII:

Formula XII

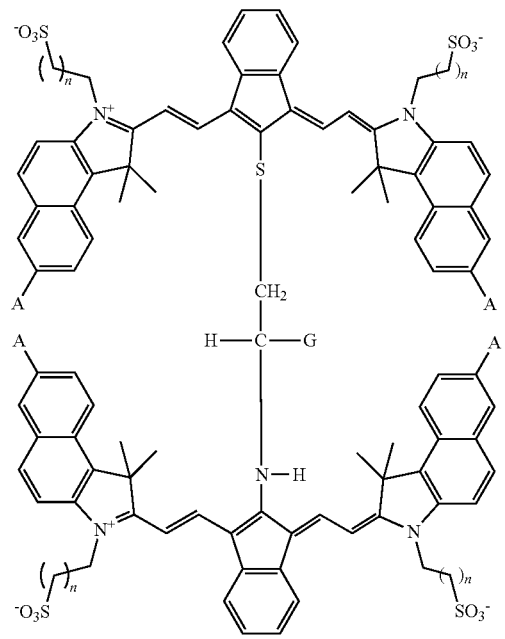

wherein

G represents H, $CO_2R$ or $CONR'R''$;

R, R', and R'' independently represent H or an optionally substituted alkyl, aralkyl, or aryl group;

n represents 1, 2, or 3;

A is H or Br; and counter ions are present to balance a charge of the cyanine dye.

11. A lithographic printing plate precursor comprising:

a cyanine dye including a first chromophoric group and a second chromophoric group that are different from each other; wherein the first chromophoric group has a main absorption in the infrared region;

the second chromophoric group has a main absorption in the visible light region; and the cyanine dye has a structure according to Formula IV:

Formula IV

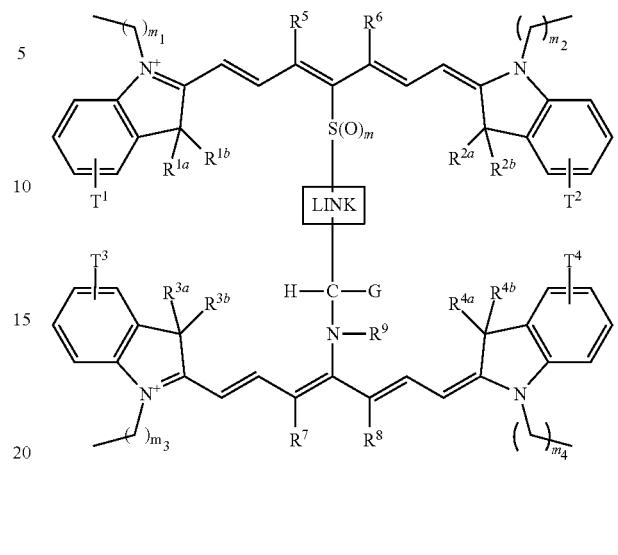

wherein

G represents H, $CO_2R$ or $CONR'R''$;

R, R', and R'' independently represent H or an optionally substituted alkyl, aralkyl, or aryl group;

$R^{1a}$, $R^{1b}$, $R^{2a}$, $R^{2b}$, $R^{3a}$, $R^{3b}$, $R^{4a}$, and $R^{4b}$ independently represent an optionally substituted alkyl, aralkyl, or aryl group, and $R^{1a}$ and $R^{1b}$, $R^{2a}$ and $R^{2b}$, $R^{3a}$ and $R^{3b}$, $R^{4a}$ and $R^{4b}$ are capable of forming a ring;

$R^5$, $R^6$, $R^7$, and $R^8$ independently represent hydrogen or an optionally substituted alkyl or aryl group, and $R^5$ and $R^6$, $R^7$ and $R^8$ are capable of forming a ring;

$R^9$ represents hydrogen or an optionally substituted alkyl group;

$T^1$, $T^2$, $T^3$, and $T^4$ independently represent H, F, Cl, Br, I, $CF_3$, CN, an optionally substituted alkyl, alkoxy, or aryl group, an optionally substituted annulated benzo ring, $—CO_2R^{a1}$, $—CONR^{a2}R^{a3}$, $—SO_2NR^{a4}R^{a5}$, $—SO_2R^{a6}$, or $—SO_3^-$, and $R^{a1}$, $R^{a2}$, $R^{a3}$, $R^{a4}$ and $R^{a5}$ independently represent hydrogen or an optionally substituted alkyl or aryl group and $R^{a6}$ represents an optionally substituted alkyl or aryl group;

m1, m2, m3, and m4 independently represent an integer ranging from 0 to 11;

m=0 or 2;

LINK represents a divalent linking group; and counter ions are present to balance a charge of the cyanine dye.

12. The lithographic printing plate precursor according to claim 11, wherein the cyanine dye has a structure according to Formula VII:

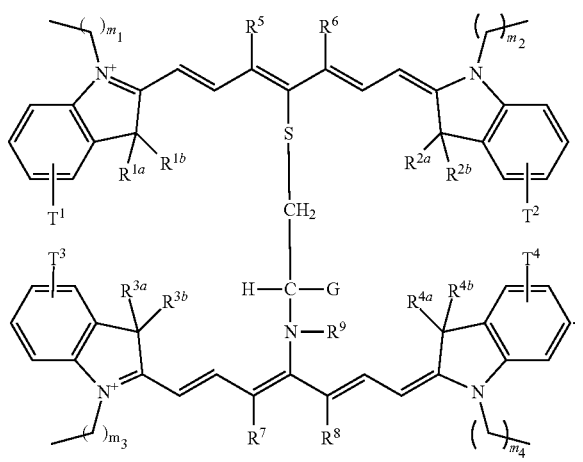

Formula VII

13. The lithographic printing plate precursor according to claim 12, wherein the cyanine dye has a structure according to Formula XI:

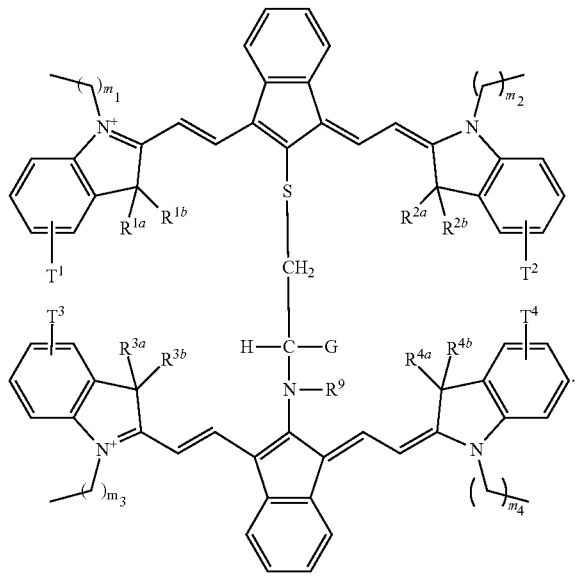

Formula XI

14. A positive working lithographic printing plate precursor comprising:
the cyanine dye as defined in claim 12.

15. A positive working lithographic printing plate precursor comprising:
the cyanine dye as defined in claim 11.

16. A cyanine dye having a structure according to Formula I:

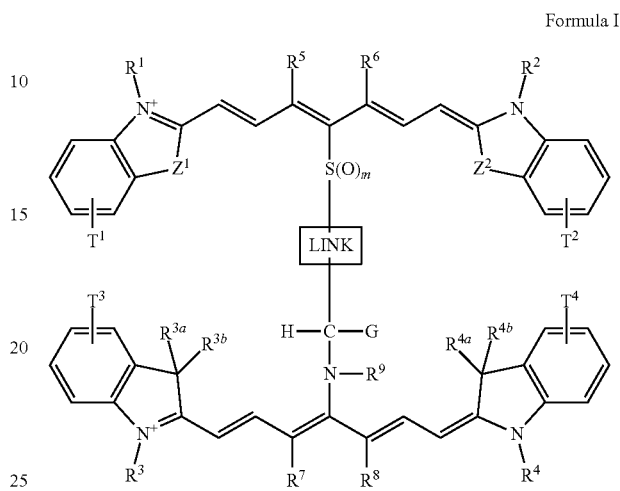

Formula I wherein
$Z^1$ represents S, $CR^{1a}R^{1b}$, or —CH=CH—;
$Z^2$ represents S, $CR^{2a}R^{2b}$, or —CH=CH—;
G represents H, $CO_2R$ or CONR'R";
R, R', and R" independently represent H or an optionally substituted alkyl, aralkyl, or aryl group;
$R^{1a}$, $R^{1b}$, $R^{2a}$, $R^{2b}$, $R^{3a}$, $R^{3b}$, $R^{4a}$, and $R^{4b}$ independently represent an optionally substituted alkyl, aralkyl, or aryl group, and $R^{1a}$ and $R^{1b}$, $R^{2a}$ and $R^{2b}$, $R^{3a}$ and $R^{3b}$, $R^{4a}$ and $R^{4b}$ are capable of forming a ring;
$R^1$, $R^2$, $R^3$, and $R^4$ independently represent an optionally substituted alkyl group;
$R^5$, $R^6$, $R^7$, and $R^8$ independently represent hydrogen or an optionally substituted alkyl or aryl group, and $R^5$ and $R^6$, $R^7$ and $R^8$ are capable of forming a ring;
$R^9$ represents hydrogen or an optionally substituted alkyl group;
$T^1$, $T^2$, $T^3$, and $T^4$ independently represent H, F, Cl, Br, I, $CF_3$, CN, an optionally substituted alkyl, alkoxy, or aryl group, an optionally substituted annulated benzo ring, —$CO_2R^{a1}$, —$CONR^{a2}R^{a3}$, —$SO_2NR^{a4}R^{a5}$, —$SO_2R^{a6}$, or —$SO_3^-$, and $R^{a1}$, $R^{a2}$, $R^{a3}$, $R^{a4}$, and $R^{a5}$ independently represent hydrogen or an optionally substituted alkyl or aryl group and $R^{a6}$ represents an optionally substituted alkyl or aryl group;
m=0 or 2;
LINK represents a divalent linking group; and
counter ions are present to balance a charge of the cyanine dye.

* * * * *